United States Patent
Chung

(10) Patent No.: US 7,219,106 B2
(45) Date of Patent: May 15, 2007

(54) SYSTEM FOR DISTRIBUTING FILES AND TRANSMITTING/RECEIVING DISTRIBUTED FILES

(75) Inventor: Sang-Won Chung, Seoul (KR)

(73) Assignee: Nexon Co., Ltd. (KR)

( * ) Notice: Subject to any disclaimer, the term of this patent is extended or adjusted under 35 U.S.C. 154(b) by 514 days.

(21) Appl. No.: 10/628,938

(22) Filed: Jul. 28, 2003

(65) Prior Publication Data

US 2004/0024766 A1    Feb. 5, 2004

(30) Foreign Application Priority Data

Aug. 2, 2002  (KR) .................... 10-2002-0045830

(51) Int. Cl.
*G06F 17/00* (2006.01)
(52) U.S. Cl. .................. 707/104.1; 707/3; 707/10; 707/102; 707/205; 709/217
(58) Field of Classification Search ............. 707/1–10, 707/100–104.1, 200–206; 709/217–219
See application file for complete search history.

(56) References Cited

U.S. PATENT DOCUMENTS 5,475,860 A * 12/1995 Ellison et al. ................ 710/26
6,006,034 A * 12/1999 Heath et al. ................ 717/170
2002/0055920 A1* 5/2002 Fanning et al. ................ 707/3
2003/0182436 A1* 9/2003 Henry ........................ 709/232
2003/0233455 A1* 12/2003 Leber et al. ................ 709/226

* cited by examiner

*Primary Examiner*—Isaac Woo
(74) *Attorney, Agent, or Firm*—Cantor Colburn LLP

(57) ABSTRACT

A system for distributing flies and transmitting/receiving the distributed files includes a file distribution/transmission/reception module depending upon an application program executable in a client computer and is performed in a background process of an application program execution module. The file distribution/transmission/reception module receives the files designated by a host computer from a network and then stores the received files, while the application program is executed. The file distribution/transmission/reception module transmits corresponding files to another client computer if the corresponding files exist, in response to another client computer's request for transmission of files designated on the host computer. The system distributes a load of the network and increases a file transmission rate by receiving and storing distributed transmission files while the application program is executed, and reduces the network load associated with a file storage computer by receiving the transmission files from the file storage computer and from oilier client computers.

42 Claims, 1 Drawing Sheet

SYSTEM FOR DISTRIBUTING FILES AND TRANSMITTING/RECEIVING DISTRIBUTED FILES

BACKGROUND OF THE INVENTION

1. Field of the Invention

The present invention relates to a system for distributing files and transmitting/receiving the distributed files, and more particularly to technologies of distributing files through a network and transmitting/receiving the distributed files.

2. Description of the Related Art

When a predetermined application program is executed in a method for transmitting/receiving files through a conventional network, a corresponding application program execution module sends a query to an update server to enquire whether at least one file needed for a corresponding application program has been updated. If files needed for the corresponding application program have been updated, the application program execution module receives the files needed for the application program from the update server according to a response to the query from the update server and performs an update operation for the application program.

However, where the capacity of files to be updated in the above-described conventional method is large and the number of computers desiring to access the update server is large when the update operation is performed, the load of a network is significant, and hence a connection to the update server may be frequently cut off or may not be appropriately performed. In this case, a period of time needed for performing the update operation increases.

To address the above-described problems, there has been recently developed a method for distributing the predetermined number of files to be updated, receiving the distributed files from the update server in advance, storing the distributed files, and executing a corresponding application program, when a user desires to execute the application program.

In other words, the recently developed method is useful in that it can distribute a predicted load of the network by receiving the predetermined number of distributed files to be updated before the application program is executed.

However, since the method independently and separately performs a process of transmitting the files to be updated and a process of executing the application program, there is another problem in that a period of time for waiting for the corresponding application program to be executed is long, where the number of files to be updated and the file capacity are large.

Moreover, there is another problem in that the method can receive only update files needed for executing the application program and cannot receive other files needed for executing other application programs.

For this reason, the applicant of the present invention has developed a system for distributing files in advance in a background process of an application program, and receiving and storing the distributed files, such that the load of a network can be reduced. Further, the system simultaneously performs a process of transmitting the files and a process of executing the application program, thereby reducing a period of time for waiting for the application program to be executed. Furthermore, the system receives the distributed files not only from a file server, but also from other client computers, and stores the received files, thereby significantly reducing the load of the file server or network.

SUMMARY OF THE INVENTION

Therefore, the present invention has been made in view of the above problems, and it is one object of the present invention to provide a system for distributing files and transmitting/receiving the distributed files, which includes a file distribution/transmission/reception module depending upon an application program executable in a client computer and performed in a background process of a corresponding application program execution module, thereby receiving files designated on a host computer from a network and storing the received files, while the application program is executed.

It is another object of the present invention to provide a system for distributing files and transmitting/receiving the distributed files, which can transmit corresponding files to another client computer if the corresponding files exist, in response to another client computer's request for transmission of files designated on a host computer.

It is yet another object of the present invention to provide a system for distributing files and transmitting/receiving the distributed files, which can send a request for transmission of files designated on a host computer to at least one client computer connected to a subnetwork, and receive corresponding files from a client computer selected from among client computers, connected to the sub-network, responsive to the file transmission request.

In accordance with an aspect of the present invention, the above and other objects can be accomplished by the provision of a system for distributing files and transmitting/receiving the distributed files, comprising: a file distribution/transmission/reception module depending upon an application program executable in a client computer and performed in a background process of a corresponding application program execution module, the file distribution/transmission/reception module receiving files designated on a host computer from a network and storing the received files while an application program is executed, or transmitting corresponding files to another client computer if the corresponding files exist, in response to another client computer's request for transmission of the files designated on the host computer.

Preferably, the file distribution/transmission/reception module may send a request for the transmission of the files designated on the host computer to at least one client computer connected to a sub-network, and receive corresponding files from a client computer selected from among client computers, connected to the sub-network, responsive to the file transmission request.

Preferably, the file transmission request may be sent to other client computers connected to the host computer, if no client computer connected to the sub-network is responsive to the file transmission request, and corresponding files may be received from a client computer selected from among the other client computers, connected to the host computer, responsive to the file transmission request.

Preferably, the file transmission request may be sent to a file storage computer designated by the host computer, if no client computer connected to the host computer is responsive to the file transmission request, and the corresponding files may be received from the file storage computer.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
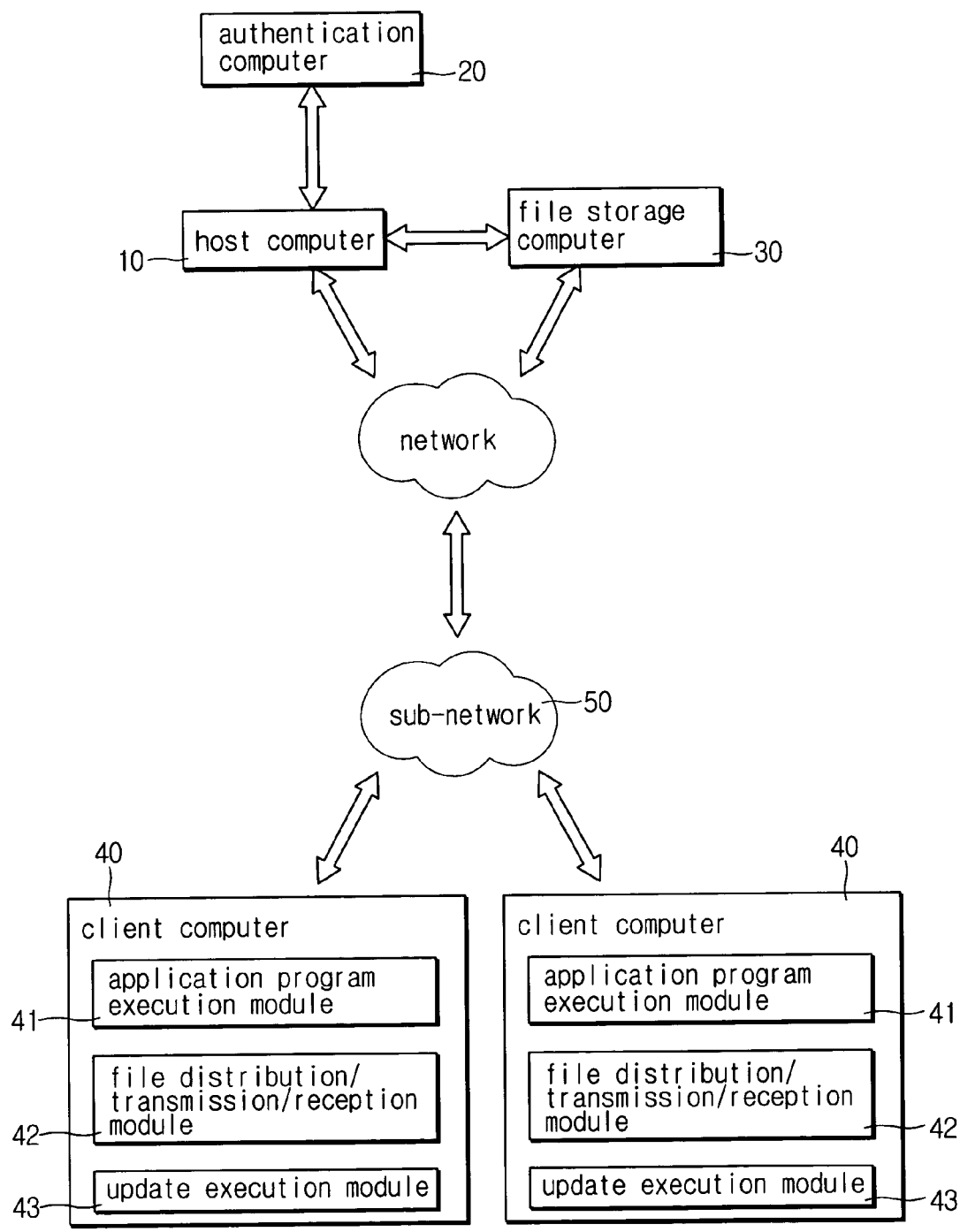
FIG. 1 is a schematic diagram illustrating a file distribution/transmission/reception system in accordance with the present invention.

Hereinafter, preferred embodiments in accordance with the present invention will be described in detail with reference to the annexed drawing such that those skilled in the art can readily implement the present invention. FIG. 1 is a schematic diagram illustrating a file distribution/transmission/reception system in accordance with the present invention. As shown in FIG. 1, the system includes a host computer 10, an authentication computer 20, a file storage computer 30 and a plurality of client computers 40.

The host computer 10 transmits data needed for executing an application program to a client computer 40 connected through a network such that the client computer 40 can execute the application program.

The authentication computer 20 performs an authentication procedure in response to access information from the client computer 40, which accesses the host computer 10. The authentication computer 20 transmits a result of the authentication procedure to the host computer 10. If the client computer 40 accessing the host computer 10 is authentic, the client computer 40 can receive the data needed for executing the application program from the host computer 10 and then execute the application program.

The file storage computer 30 stores an installation file of a corresponding application program, files to be updated and various files to be transmitted when the application program is executed. Under the control of the host computer 10, the files are transmitted in a background process of the application program when the application program is executed.

The host computer 10, the authentication computer 20 and the file storage computer 30 can be physically or logically separated and installed.

The client computer 40 can be connected to the host computer 10 through a sub-network 50 such as an Internet cafe, etc. or another network such that the client computer 40 can receive data needed for executing the application program from the host computer 10 and then execute the application program.

The system of the present invention includes an application program execution module 41 and a file distribution/transmission/reception module 42.

The application program execution module 41 is software for executing the application program and executes the application program in a foreground process.

At this time, the application program execution module 41 accesses the host computer 10 through the network and then sends an authentication request to the host computer 10. It is preferable that the application program execution module 41 receives data needed for executing the application program from the host computer 10 and then executes the application program, according to the authentication procedure of the authentication computer 20.

That is, the host computer 10 transmits the data needed for executing the application program to the client computer 40. The application program execution module 41 executable in the client computer 40 receives the data needed for executing the application program and then executes the application program in the foreground process.

As an example, in a state where the client computer 40 is connected to the network, if the application program execution module 41 is executed and an identification (ID) and a password are inputted and transmitted to the host computer 10, the host computer 10 receives access information including the ID and the password and sends an authentication request by transmitting the access information to the authentication computer 20.

At this time, a corresponding client computer 40 transmits membership information to the host computer 10 in advance, according to a predetermined membership subscription procedure. If it is assumed that the membership information has been registered in the authentication computer 20, the authentication computer 20 searches for the membership information and performs the authentication procedure. Since techniques relating to the membership registration and authentication are well known to those skilled in the art, a detailed description of the techniques is omitted.

If the authentication computer 20 determines that a corresponding client computer 40 is authentic, the host computer 10 transmits the data needed for executing the application program to the client computer 40, and the application program execution module 41 executable in the client computer 40 receives the data needed for executing the application program and then executes the application program in the foreground process.

The module 42 depends upon an application program executable in the client computer 40 and is performed in the background process of the application program execution module 41. The module 42 receives files designated on the host computer 10 from the network and stores the received files, while the application program is executed. Alternatively, the module 42 can transmit corresponding files to another client computer if the corresponding files exist, in response to another client computer's request for transmission of files designated on the host computer 10.

In other words, the module 42 is software for receiving the files to be transmitted. When the module 42 is executed in the background process while the application program execution module 41 of the client computer 40 is executed in the foreground process, the module 42 receives the files to be transmitted from the network and stores the received files.

Moreover, the module 42 can transmit a request for transmission of files designated on the host computer 10 to at least one client computer 40 connected to the sub-network 50, and receive corresponding files from a client computer 40 selected from among other client computers, connected to the sub-network 50, responsive to the file transmission request.

In other words, when the module 42 receives the files designated on the host computer 10, the file transmission request is sent to other client computers belonging to the sub-network 50, e.g., client computers of the Internet cafe. The module 42 can receive the corresponding files from a client computer selected from among the client computers, connected to the sub-network 50, responsive to the file transmission request. Thus, the module 42 can receive the files not only from the file storage computer 30, but also from other client computers belonging to the same sub-network 50, thereby reducing a load of the network associated with the file storage computer 30.

On the other hand, if a response to the file transmission request is not received from any of other client computers connected to the sub-network 50, the file transmission request is sent to other client computers connected to the host computer 10. The module 42 can receive corresponding files from a client computer selected from among the client computers, connected to the host computer 10, responsive to the file transmission request.

That is, when no client computer connected to the sub-network 50 is responsive to the file transmission request where the module 42 receives corresponding files, the module 42 transmits the file transmission request to the respective client computers connected to the host computer 10. The module 42 can receive the corresponding files from the client computer selected from among the client computers, connected to the host computer 10, responsive to the file transmission request. Thus, the module 42 can receive the files not only from the file storage computer 30, but also from other client computers currently connected to the host computer 10, thereby reducing a load of the network associated with the file storage computer 30.

At this time, it is preferable that the module 42 receives a list of clients currently connected to the host computer 10, and transmits the file transmission request to client computers 40 contained in the list of clients.

Moreover, when files are received from a client computer selected from among other client computers responsive to the file transmission request, it is preferable that a client computer responsive to the file transmission request for the first time is selected and the files are received from the selected client computer.

The module 42 carries out an offset division operation for a corresponding file on the basis of the number of client computers responsive to the file transmission request within a predetermined time, receives data of different offset areas from the responsive client computers, combines items of the data of the different offset areas into a single file, and stores the file.

In other words, the module 42 carries out the offset division operation for the corresponding file on the basis of the number of client computers responsive to the file transmission request within a predetermined time, receives the data of different offset areas from the responsive client computers, and combines the items of the data of the different offset areas into the single file, thereby receiving divided file data items from a plurality of client computers.

On the other hand, where no client computer connected to the host computer 10 is responsive to the file transmission request, the file transmission request is sent to the file storage computer 30 designated by the host computer 10 and corresponding files are received from the file storage computer 30.

In other words, where there is no client computer connected to the host computer 10 responsive to the file transmission request when the files are received through the module 42, the module 42 transmits the file transmission request to the file storage computer 30 and then receives corresponding files from the file storage computer 30, thereby distributing a load of the network and hence increasing an entire operation speed when the file transmission operation is performed.

It is preferable that the list of files designated on the host computer 10 is received from the host computer 10 every time an application program is accessed.

On the other hand, the file storage computer 30 can be the host computer 10. In this case, the host computer 10 stores transmission files in its own database and then transmits the transmission files in response to the file transmission request from the client computer 40 connected to the network.

It is preferable that the files received by the module 42 are stored in a predetermined folder. That is, it is preferable that the transmission files received by the module 42 are stored in another folder different from a folder storing the application program executable in the foreground process.

The files received and stored by the module 42 can be update files of the application program. Thus, a client computer can readily distribute the files to be updated and receive the distributed files while the application program is executed, as when the client computer distributes and stores the files of an on-line game program to be updated in advance while the on-line game program is executed. The system of the present invention further includes an update execution module 43 for updating the application program execution module 41 using the stored files to be updated at an update time.

The update execution module 43 is software for updating the files to be updated at the update time. Before the application program execution module 41 is executed, the update execution module 43 is independently executed in the foreground process. The update execution module 43 is executed in the foreground process at the update time, updates the application program execution module 41 using the received update files, and executes the application program execution module 41.

In this case, the module 42 stores the received update files in a predetermined update file folder. Thus, it is preferable that the update files stored in the predetermined update file folder are copied or shifted to a corresponding application program folder, when the update execution module 43 performs an update operation.

As described above, since the files to be updated are received and stored through the module 42 while the application program is executed, a capacity of initial distribution can be reduced at a time of performing an update operation through the update execution module 43 and the load of the network can be distributed, thereby entirely increasing an update operation speed.

Moreover, the files received and stored by the module 42 can be associated with an installation or execution of another application program.

In other words, when there are received files associated with another application program, but not associated with the executed application program, while a predetermined application program is executed, another application program can be executed in a time set by the host computer 10 or in response to a client's execution command. Thus, when a newly released game program is transmitted while a predetermined game program is executed, the newly released game program can be automatically executed. At this time, the newly released game program can be advertised to the client and various contents or files associated with the newly released game program can be provided to the client.

The files received and stored by the module 42 can be data files readable by the application program or another application program. That is, various music or image files are received while a predetermined application program is executed, and the received files can be read later on by a predetermined program.

It is preferable that the module 42 checks a file transmission error for completely received files when the application program is executed such that a corresponding file can be re-transmitted when the corresponding file is erroneous.

In other words, the module 42 performs a cyclic redundancy code (CRC) check for the completely received files using a CRC character of each file contained in the information of the transmission file list such that a corresponding file can be re-transmitted when the corresponding file is erroneous.

Transmission files designated on the host computer 10 can have transmission priorities when the files are transmitted to the client computer 40.

That is, the transmission file list information received from the host computer 10 includes the transmission priorities of the transmission files. When the transmission files are received through the module 42, the files are received on the basis of the transmission priorities.

At this time, the host computer 10 or the module 42 can randomly designate the transmission priorities.

It is preferable that a CPU occupancy ratio of the module 42 is relatively smaller than that of the application program execution module 41 such that influence of the module 42 executed in the background process with respect to the application program execution module 41 executed in the foreground process can be minimized.

That is, the module 42 is repeatedly executed and stopped in the background process of the application program execution module 41 in a very short time at a predetermined time interval, such that the CPU occupancy ratio of the module 42 becomes relatively smaller that that of the application program execution module 41.

Since a speed for executing an application program such as an on-line game program is very important to a user, it is not preferable that a speed for executing the application program is reduced, when the files are transmitted while the application program is executed. Thus, the CPU occupancy ratio of the module 42 must be relatively smaller that that of the application program execution module 41. The module 42 must be repeatedly executed and stopped in the background process of the application program execution module 41 in the very short time at the predetermined time interval.

Where receiving the files designated by the host computer 10, the module 42 updates information of a file transmission state and then the updated information is stored in a computer designated by the host computer 10.

The module 42 must recognize which file of the transmission files contained in the transmission file list information has been received such that a previously received file cannot be re-transmitted when the module 42 is re-executed. As the module 42 receives the transmission files, and updates and stores the file transmission state information, the module 42 can recognize which file of the transmission files contained in the transmission file list information has been received. The updated file transmission state information can be used as statistical data for a server, since it is transmitted and stored to the file storage computer 30.

Thus, the system of the present invention enables a file distribution/transmission/reception module to be executed in a background process of an application program execution module executable in a foreground process such that transmission files designated by a host computer can be received from a network according to a transmission file list and the received files can be stored. In response to a file transmission request from another client computer, the file distribution/transmission/reception module transmits at least one corresponding transmission file if the corresponding transmission file exists. Further, the file distribution/transmission/reception module can receive the transmission files from the file storage computer, or transmit a request for transmission of files designated on a host computer to at least one client computer connected to a subnetwork, and receive corresponding files from a client computer selected from among client computers, connected to the sub-network, responsive to the file transmission request.

If there is no response to the file transmission request from other client computers connected to the sub-network, the file transmission request is sent to other client computers connected to the host computer and then the files are received from a client computer selected from among the client computers, connected to the host computer, responsive to the file transmission request. On the other hand, if there is no response to the file transmission request from other client computers connected to the host computer, the file transmission request is sent to a file storage computer. As the transmission files are received from the file storage computer, the received transmission files are stored while the application program is executed.

As described above, it is preferable that files needed for executing an application program in a file distribution/transmission/reception system of the present invention can be applied to updating an on-line game program. Optionally, the files needed for executing the application program in the system of the present invention can be preferably applied to updating software for updating data files needed for executing the application program through the network. Moreover, the present invention can be applied to distributing and receiving all files such as various music files, image contents files or installation or executable files for other application programs.

Therefore, the above-described objects of the present invention can be accomplished by the above-described system.

As apparent from the above description, the present invention provides a file distribution/transmission/reception system, which can distribute a load of a network and entirely increase a file transmission rate by receiving and storing distributed transmission files while an application program is executed, and reduce the load of the network associated with a file storage computer by receiving the transmission files not only from the file storage computer, but also from other client computers.

The preferred embodiments of the present invention have been disclosed for illustrative purposes. Further, those skilled in the art will appreciate that various modifications, additions and substitutions are possible, without departing from the scope and spirit of the invention as disclosed in the accompanying claims.

What is claimed is:

1. A system for distributing files and transmitting/receiving the distributed files, comprising:

a file distribution/transmission/reception module depending upon an application program executable in a client computer and performed in a background process of a corresponding application program execution module, the file distribution/transmission/reception module receiving the files designated by a host computer from a network and storing the received files while an application program is executed, or transmitting corresponding files to another client computer if the corresponding files exist, in response to another client computer's request for transmission of the files designated by the host computer;

the file distribution/transmission/reception module sending a request for the transmission of the files designated by the host computer to at least one client computer connected to a sub-network, and receiving corresponding files from a client computer selected from among client computers, connected to the sub-network, responsive to the file transmission request;

the file transmission request is sent to other client computers connected to the host computer, if no client computer connected to the sub-network is responsive to the file transmission request, then corresponding files are received from a client computer selected from among the other client computers, connected to the host computer, responsive to the file transmission request;

wherein a CPU occupancy ratio of the file distribution/transmission/reception module is relatively smaller than that of the application program execution module such that influence of the file distribution/transmission/reception module executed in the background process with respect to the application program execution module executed in the foreground process can be minimized.

2. The system as set forth in claim 1, wherein the file transmission request is sent to a file storage computer designated by the host computer, if no client computer connected to the host computer is responsive to the file transmission request, then the corresponding files are received from the file storage computer.

3. The system as set forth in claim 2, wherein the file storage computer is the host computer.

4. The system as set forth in claim 3, wherein the files received by the file distribution/transmission/reception module are stored in a predetermined folder.

5. The system as set forth in claim 3, wherein the file distribution/transmission/reception module checks a file transmission error for completely received files when the application program is executed such that a corresponding file can be re-transmitted when the corresponding file is erroneous.

6. The system as set forth in claim 3, wherein the files designated by the host computer have transmission priorities for client computers.

7. The system as set forth in claim 3, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

8. The system as set forth in claim 3, wherein the file distribution/transmission/reception module updates information of a file transmission state and then the updated information is stored in a computer designated by the host computer.

9. The system as set forth in claim 3, wherein a list of files designated by the host computer is received from the host computer every time the application program is accessed.

10. The system as set forth in claim 2, wherein the files received by the file distribution/transmission/reception module are stored in a predetermined folder.

11. The system as set forth in claim 2, wherein the file distribution/transmission/reception module checks a file transmission error for completely received files when the application program is executed such that a corresponding files can be re-transmitted when the corresponding file is erroneous.

12. The system as set forth in claim 2, wherein the files designated by the host computer have transmission priorities for client computers.

13. The system as set forth in claim 2, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

14. The system as set forth in claim 2, wherein the file distribution/transmission/reception module updates information of a file transmission state and then the updated information is stored in a computer designated by the host computer.

15. The system as set forth in claim 2, wherein a list of files designated by the host computer is received from the host computer every time the application program is accessed.

16. The system as set forth in claim 1, wherein the files received by the file distribution/transmission/reception module are stored in a predetermined folder.

17. The system as set forth in claim 16, wherein the files received and stored by the file distribution/transmission/reception module are update files for the application program.

18. The system as set forth in claim 17, further comprising:
an update execution module for updating the application program execution module using stored update files at an update time.

19. The system as set forth in claim 18, wherein the file distribution/transmission/reception module checks a file transmission error for completely received files when the application program is executed such that a corresponding file can be re-transmitted when the corresponding file is erroneous.

20. The system as set forth in claim 18, wherein the files designated by the host computer have transmission priorities for client computers.

21. The system as set forth in claim 18, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

22. The system as set forth in claim 17, wherein the file distribution/transmission/reception module checks a file transmission error for completely received files when the application program is executed such that a corresponding file can be re-transmitted when the corresponding file is erroneous.

23. The system as set forth in claim 17, wherein the files designated by the host computer have transmission priorities for client computers.

24. The system as set forth in claim 17, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

25. The system as set forth in claim 16, wherein the files received and stored by the file distribution/transmission/reception module are associated with an installation or execution of another application program.

26. The system as set forth in claim 25, wherein the file distribution/transmission/reception module checks a file transmission error for completely received files when the application program is executed such that a corresponding file can be re-transmitted when the corresponding file is erroneous.

27. The system as set forth in claim 25, wherein the files designated by the host computer have transmission priorities for client computers.

28. The system as set forth in claim 25, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

29. The system as set forth in claim 16, wherein the files received and stored by the file distribution/transmission/reception module are data files readable by the application program or another application program.

30. The system as set forth in claim 29, wherein the file distribution/transmission/reception module checks a file transmission error for completely received files when the application program is executed such that a corresponding file can be re-transmitted when the corresponding file is erroneous.

31. The system as set forth in claim 29, wherein the files designated by the host computer have transmission priorities for client computers.

32. The system as set forth in claim 29, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

33. The system as set forth in claim 1, wherein the file distribution/transmission/reception module receives a list of currently connected clients from the host computer, and sends the file transmission request to client computers contained in the client list.

34. The system as set forth in claim 33, wherein the file distribution/transmission/reception module checks a file transmission error for completely received files when the application program is executed such that a corresponding file can be re-transmitted when the corresponding file is erroneous.

35. The system as set forth in claim 33, wherein the files designated by the host computer have transmission priorities for client computers.

36. The system as set forth in claim 33, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

37. The system as set forth in claim 1, wherein the file distribution/transmission/reception module is repeatedly executed and stopped in the background process of the application program execution module in a very short time at a predetermined time interval.

38. The system as set forth in claim 1, wherein the file distribution/transmission/reception module checks a file transmission error for completely received files when the application program is executed such that a corresponding file can be re-transmitted when the corresponding file is erroneous.

39. The system as set forth in claim 1, wherein the files designated by the host computer have transmission priorities for client computers.

40. The system as set forth in claim 1, wherein the file distribution/transmission/reception module carries out an offset division operation for a corresponding file on the basis of the number of client computers responsive to the file transmission request within a predetermined time, receives data of different offset areas from the responsive client computers, combines items of the data of the different offset areas into a single file, and stores the file.

41. The system as set forth in claim 1, wherein the file distribution/transmission/reception module updates information of a file transmission state and then the updated information is stored in a computer designated by the host computer.

42. The system as set forth in claim 1, wherein a list of files designated by the host computer is received from the host computer every time the application program is accessed.

* * * * *